United States Patent [19]

Maurice

[11] Patent Number: 5,086,362
[45] Date of Patent: Feb. 4, 1992

[54] MULTIPLE-TRACK MAGNETIC RECORDING HEAD HAVING A MATRIX OF MAGNETIC MICROHEADS

[75] Inventor: François Maurice, Verrieres le Buisson, France

[73] Assignee: Thomson-CSF, Puteaux, France

[21] Appl. No.: 552,088

[22] Filed: Jul. 13, 1990

[30] Foreign Application Priority Data

Jul. 21, 1989 [FR] France ............... 89 09887

[51] Int. Cl.[5] .................................. G11B 5/147
[52] U.S. Cl. .............................. 360/121; 360/110; 360/126; 360/119
[58] Field of Search .......... 360/110, 113, 121, 122, 360/119, 125, 126; 365/238

[56] References Cited

U.S. PATENT DOCUMENTS

| | | | |
|---|---|---|---|
| 3,500,347 | 3/1970 | Schweizerhof | 360/110 |
| 3,510,855 | 5/1970 | Howells | 360/110 |
| 3,562,759 | 2/1971 | Brewster | 360/110 |
| 3,662,361 | 5/1972 | Mee | 360/110 |
| 4,827,218 | 5/1989 | Meunier et al. | 360/113 |
| 4,967,300 | 10/1990 | Reid et al. | 360/121 |
| 4,972,336 | 11/1990 | Reid et al. | 360/121 |

FOREIGN PATENT DOCUMENTS 1511893 12/1967 France .
2588406 10/1985 France .

Primary Examiner—Aristotelis Psitos
Assistant Examiner—Alfonso Garcia
Attorney, Agent, or Firm—Oblon, Spivak, McClelland, Maier & Neustadt

[57] ABSTRACT

The magnetic head has poles at each intersection of the matrix of wires. These poles connect the pads of the same column of pads, a gap being defined between the pads of the same intersection of wires and being parallel to the data wire.

11 Claims, 4 Drawing Sheets

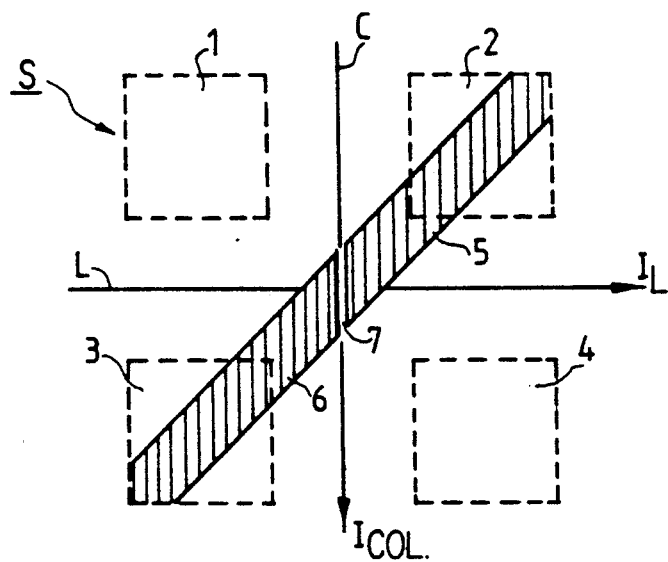
FIG. 1
PRIOR ART
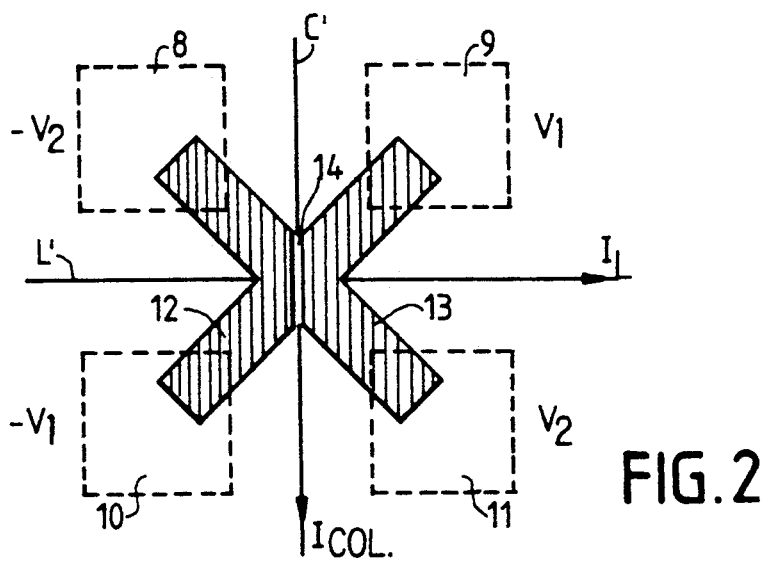
FIG. 2
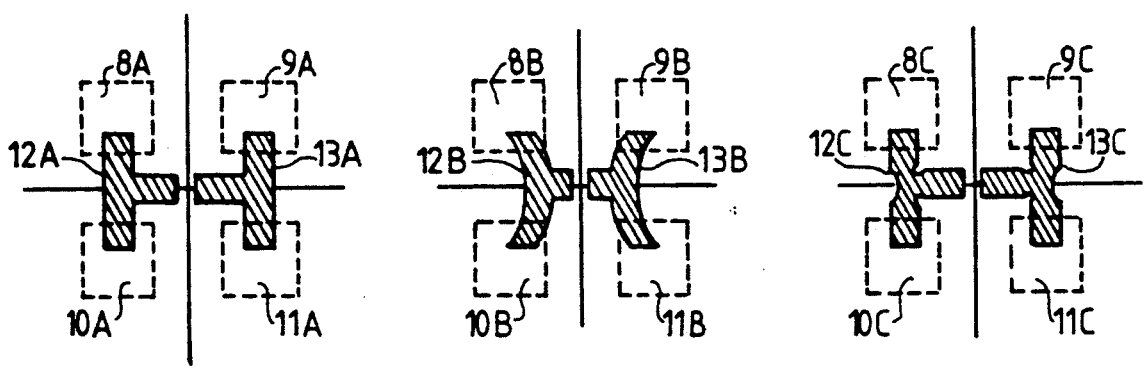
FIG. 3     FIG. 4     FIG. 5

MULTIPLE-TRACK MAGNETIC RECORDING HEAD HAVING A MATRIX OF MAGNETIC MICROHEADS

BACKGROUND OF THE INVENTION

The present invention pertains to a magnetic recording head with high field contrast.

In multiple-track magnetic recording heads with a dense network of microheads, with matrix addressing, it is sought to obtain maximum contrast of the writing field between excited writing heads and writing heads at rest. Known heads of this type generally have a field contrast equal at most to about three.

There are known heads, for example a head according to the French patent application No. 85 14766, with a higher field contrast, but this is obtained by heating a magnetic material, placed in the magnetic circuit, beyond its Curie point. However, such a material should combine a set of characteristics (Curie point, resistivity, magnetic field at saturation point) that are difficult to obtain simultaneously.

SUMMARY OF THE INVENTION

An object of the present invention is a multiple-track magnetic recording head with a dense network of microheads, having the highest possible field contrast between excited microheads and microheads at rest, while at the same time having high writing efficiency, the making of this head being as simple as possible and inexpensive.

According to the invention, there is proposed a multiple-track magnetic recording head, of the type with a compact matrix structure of magnetic microheads, controlled by inhibition, having a matrix of pads made of magnetic material projecting out of a supporting substrate made of magnetic material, electrical conductors being arranged matricially in the inter-pad spaces, wherein each microhead has a magnetic circuit formed by four neighboring pads, the part of the substrate that joins them and two poles made of magnetic material, each pole magnetically connecting two pads, these two poles coming near each other at the intersection of the electrical conductors in defining a gap.

BRIEF DESCRIPTION OF THE DRAWINGS

The present invention shall be understood more clearly from the following detailed description of several embodiments, taken as non-restrictive examples and illustrated by the appended drawing, wherein:

FIG 1 is a partial and schematic plane view of a prior art magnetic head;

FIG. 2 is a partial and schematic plane view of a magnetic head according to the invention;

FIGS. 3 to 6 are views of variants of shapes of poles that can be formed on the magnetic head according to the invention;

DETAILED DESCRIPTION OF THE INVENTION

Figure 6:
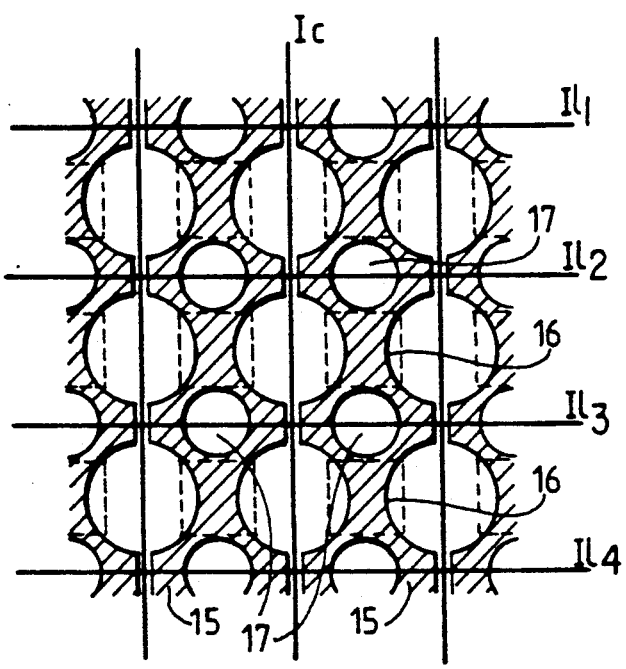

FIG. 1 shows a schematic view of a part of a prior art matrix type magnetic recording head. This head has a Cartesian network of substantially square sectioned magnetic pads formed, for example, by grooving in a substrates made of magnetic material such as ferrite. FIG. 1 shows four of these pads by dashed lines, referenced 1 to 4. Wires of lines L and columns C are placed in the grooves defined between these pads. By convention, it shall be assumed throughout the present description that the line wires are those in which a selection current is sent, and that the column wires are those to which are sent the items of data recorded by the head on a magnetic recording medium (magnetic tape or disk). Poles 5 and 6 respectively are formed on pads arranged symmetrically with respect to the intersection of a conductor C and a conductor L, for example on the pads 2 and 3, and on the non-magnetic material filling the inter-pad space. These poles have, for example, the form of strips positioned at 45 degrees with respect to the conductive wires C and L and extend up to the intersection of the conductors C and L, leaving between them a gap that is generally parallel to the conductor C. The magnetic circuit comprising the pads 2, 3, their substrate and the poles 5,6 constitute a magnetic microhead, the gap of which is the gap 7. In this known head, the column current alone is not enough to record the tape. When a line is excited, the field in the gap becomes thrice as high and sufficient to record the tape.

A known head such as this has a writing field contrast of three between the heads excited by a line current and the other heads.

The magnetic recording head according to the invention, partially shown in FIG. 2, has pads, such as the pads 8 to 11, which alone are shown, similar to the pads 1 to 4 and positioned similarly. A column conductor C' and a line conductor L' run between these pads.

Poles 12 and 13, symmetrical with respect to the conductor C', are formed. The pole 12 joins the pads 8 and 10 (which are positioned symmetrically with respect to the conductor L') pole 13 joins the pads 9 and 11 (which are positioned symmetrically with respect to the conductor L'). The poles 12 and 13 have parts that join up at the intersection of the wires L' and C', a narrow gap (one micron or less) 14 being made between these parts. This gap 14 is advantageously parallel to C'. In the embodiment of FIG. 2, the poles 12, 13 form a V and said parts that join up are the peaks of the V.

According to the embodiments of FIGS. 3 to 5, these poles have shapes approaching, in varying degrees, that of a T, with the crosswise arm of the T joining the pads while its "vertical" arm ends at the gap and is rectilinear. In FIG. 4, the crosswise arms of the poles 12B, 13B are arcuate. In FIG. 5, the arms of the Ts formed by the poles 12C, 13C are rectilinear but have a narrowed portion at the junction.

FIG. 6 shows an embodiment according to which the poles connecting the successive pads of each column of pads form a continuous strip 15. These strips 15 have narrowings 16 above the pads and axial holes 17 between the pads. Thus, if we consider the portion of a strip connecting two successive pads, it is seen that it has a substantially V shape.

The characteristic common to all the embodiments of the magnetic recording head described above is that the (V-shaped or T-shaped) poles provide a path with low magnetic reluctance for the excitations due to the line wires, namely between two consecutive pads of the same column (for example the pads 8 and 10 of FIG. 2). This means that a magnetic circuit such as the one having the pads 8 and 10 with their supporting substrate 5 and the pole 12 can easily be saturated under the normal conditions of use of the magnetic head by means of a current flowing in the line wire L'.

Owing to the symmetry of the magnetic circuits with respect to the line wire (L'), a current flowing in this line wire induces practically no magnetomotive force in the gap 14.

When pieces of information have to be recorded on the track running before the gap 14, the current is cut off from L', and the efficiency at an excitation current applied to the column conductor C' again becomes normal and, in principle, better than that of the standard head of FIG. 1, for the reluctance of the poles may be lower in the case of FIG. 2, through the dual path offered to the magnetic flux (the two arms of the X formed by the poles 12, 13).

Figure 7:
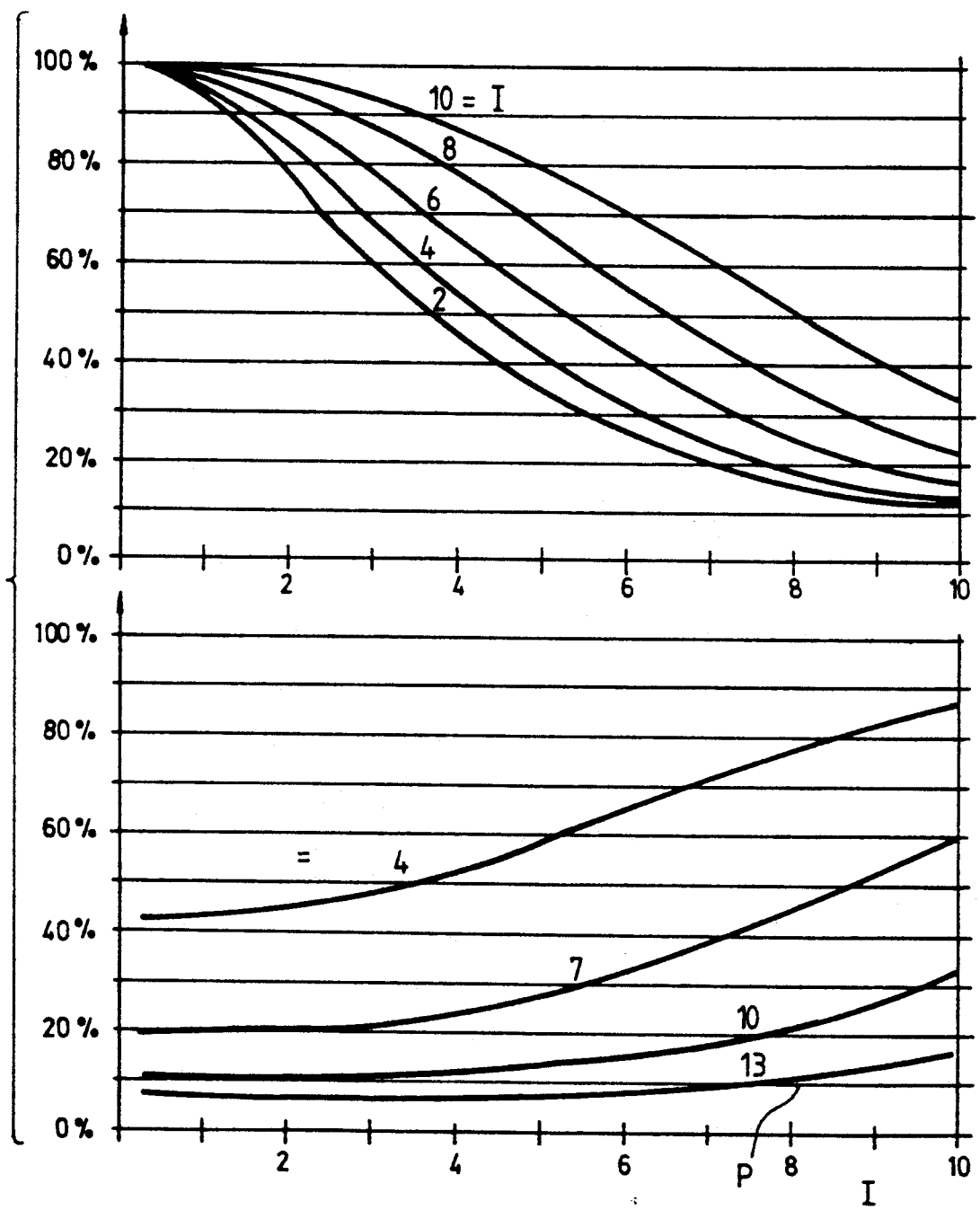
FIG. 7 is a graph showing the effect of inhibition as a function of the current applied to the lines and columns of the network of conductive wires of the head of FIG. 2.

FIG. 7 shows the results of simulations achieved by making a simplified model of the geometry of the head of FIG. 2. In this FIG. 7, the y-axis values of the two graphs are graduated in percentages of efficiency of the head, i.e. ratio of the field in the gap with inhibition to the field in the gap without inhibition. The x-axis values are line current values for the top graph and column current values for the bottom graph, the parameters for the different curves plotted being, respectively, the column current and the line current (in arbitrary units).

It can be seen in this FIG. 7 that, for example, for the point P (bottom graph), the efficiency can be reduced to about 10% of its maximum value through the application of a line current smaller than twice the column current. The contrast obtained (10%, that is 1 to 10) is about three times greater than that of FIG. 1 (about 1 to 3).

Figure 8:
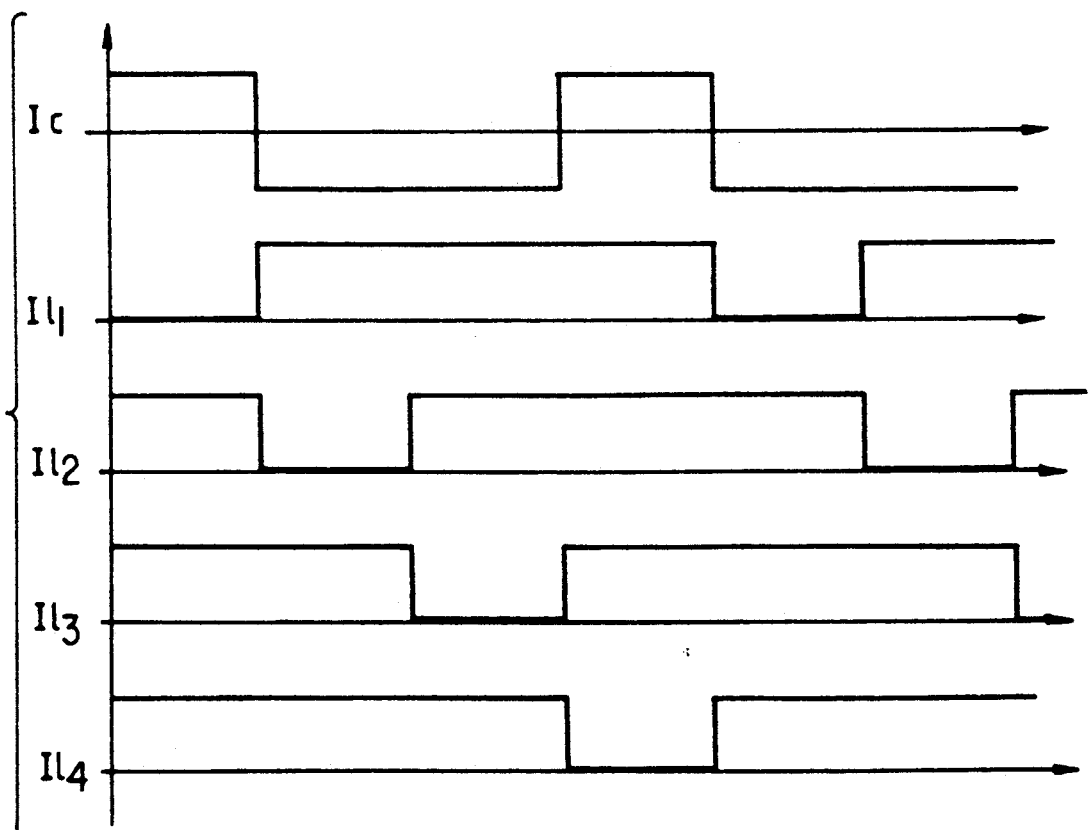
FIGS. 8 and 9 are examples of timing diagrams of the control voltages of the head of FIG. 2.

FIG. 8 shows an example of a timing diagram of excitation of the head according to the invention. On the first line of the timing diagram, a signal IC to be recorded, sent to a column wire, has been shown. The following lines of the diagram show the shapes of the inhibition signals IL1 to IL4, sent to four consecutive lines L1 to L4. These signals IL1 to IL4 disinhibit the lines L2, L3, L4, L1, L2 successively.

Figure 9:
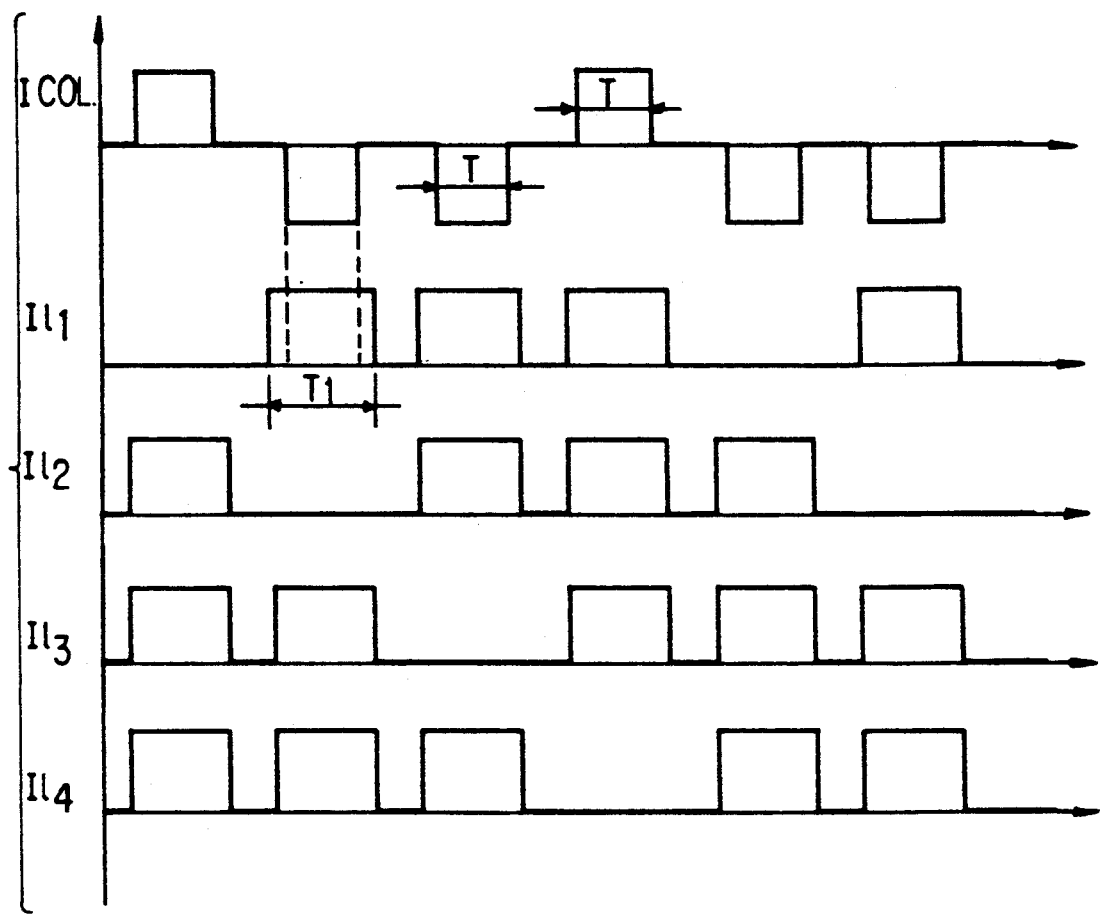

As shown in FIG. 9, the inhibition time of the lines can be reduced so as to reduce the current consumption of the head.

The lines of the timing diagram of FIG. 9 are the same as those of FIG. 8: IC and IL1 to IL4. To reduce the inhibition current dispatching times, IC is sent in the form of pulses with a duration T that is just enough for acquisition by a microhead, the line wire of which is disinhibited. As a consequence, it is enough send pulses, on the lines to be inhibited, with a duration T1 that is slightly greater than T. In the timing diagram of FIG. 9, the sequence of activation of the lines is the same as for FIG. 8: L2, L3, L4, L1, L2. The minimum duration of the inhibition pulses is fixed, in particular, by the inductance of the line wires and column wires.

Figure 10:
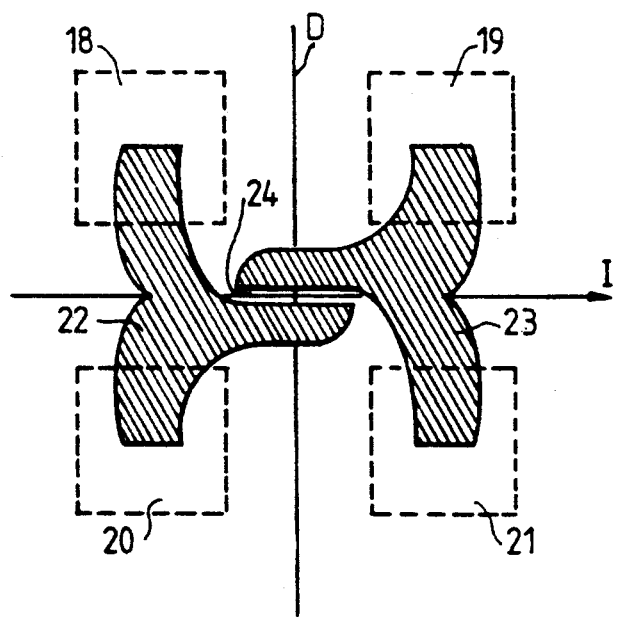
FIG. 10 is a view of a variant of poles according to the invention, having geometrical symmetry with respect to a point.

FIG. 10 gives a schematic view of four pads 18 to 21, a data wire D, an inhibition wire I and two poles 22, 23 that are symmetrical with respect to the intersection of the wires D and I. These two poles define a gap 24 parallel to the wire I.

What is claimed is:

1. A multiple-track magnetic recording head, including means for generating and sensing magnetic fields, comprising:

a compact matrix structure of magnetic microheads, controlled by inhibition, formed in a Cartesian matrix of pads made of magnetic material projecting out of a supporting substrate made of magnetic material, and electrical conductors being intersectingly arranged in inter-pad spaces, wherein each microhead has a magnetic circuit formed by four neighboring pads, a part of the substrate that joins said four neighboring pads, and two poles made of magnetic material, each pole magnetically connecting two of said four neighboring pads, these two poles near each having a gap defined therebetween at an intersection of electrical conductors associated with said four neighboring pads.

2. A magnetic head according to claim 1, wherein the poles are made of an easily saturable material.

3. A magnetic head according to claim 1, wherein said magnetic recording is controlled by inhibition by saturation of the poles.

4. A magnetic head according to claim 1 wherein, in each microhead, the poles intersect a control wire by inhibition and are located on either side of a data wire.

5. A magnetic head according to claim 4 wherein, in each microhead, the poles have a geometrical symmetry with respect to the data wire.

6. A magnetic head according to claim 4 wherein, in each microhead, the poles have a geometrical symmetry with respect to the control wire.

7. A magnetic head according to claim 4 wherein, in each microhead, the poles have a geometrical symmetry with respect to a point of intersection of the data wire and the control wire.

8. A magnetic head according to claim 5, wherein the poles have approximately the shape of a "V".

9. A magnetic head according to claim 5, wherein the poles have approximately the shape of a "T".

10. A magnetic head according to claim 1, wherein the gap defined between poles relative to an intersection of wires is substantially parallel to an data wire.

11. A magnetic head according to claim 1, wherein the gap defined between poles relative to the same intersection of wires is substantially parallel to the control wire.

* * * * *